(12) United States Patent
Ao

(10) Patent No.: US 10,579,178 B2
(45) Date of Patent: Mar. 3, 2020

(54) INPUT DEVICE

(71) Applicant: Hosiden Corporation, Yao-shi, Osaka (JP)

(72) Inventor: Hitoshi Ao, Yao (JP)

(73) Assignee: HOSIDEN CORPORATION, Yao-Shi (JP)

( * ) Notice: Subject to any disclaimer, the term of this patent is extended or adjusted under 35 U.S.C. 154(b) by 7 days.

(21) Appl. No.: 15/995,623

(22) Filed: Jun. 1, 2018

(65) Prior Publication Data

US 2018/0356928 A1 Dec. 13, 2018

(30) Foreign Application Priority Data

Jun. 9, 2017 (JP) .................................. 2017-113960

(51) Int. Cl.
*G06F 3/041* (2006.01)
*G06F 1/16* (2006.01)
*G06F 3/01* (2006.01)
*G06F 3/044* (2006.01)

(52) U.S. Cl.
CPC .......... *G06F 3/0412* (2013.01); *G06F 1/1626* (2013.01); *G06F 1/1643* (2013.01); *G06F 3/016* (2013.01); *G06F 3/041* (2013.01); *G06F 3/044* (2013.01); *G06F 2203/014* (2013.01)

(58) Field of Classification Search
CPC ...... G06F 3/016; G06F 3/0414; G06F 3/0416; G06F 2203/04105; G06F 3/01; G06F 3/045; G06F 2203/014; H01L 41/0906
See application file for complete search history.

(56) References Cited

U.S. PATENT DOCUMENTS

| 2013/0106758 A1* | 5/2013 | Radivojevic ............ G06F 3/044 345/174 |
| 2013/0201127 A1 | 8/2013 | Abe et al. |
| 2017/0285848 A1* | 10/2017 | Rosenberg ............ G06F 3/0202 |
| 2019/0074426 A1* | 3/2019 | Nakao ........................ B06B 1/04 |

FOREIGN PATENT DOCUMENTS

JP  2007-034991  2/2007

OTHER PUBLICATIONS

European Search Report dated Oct. 8, 2018, 7 pages.

* cited by examiner

*Primary Examiner* — Gerald Johnson
(74) *Attorney, Agent, or Firm* — Rankin, Hill & Clark LLP

(57) ABSTRACT

An input device includes a plate-like operation panel in which a touch sensor is placed. The plate-like operation panel has a touch surface to be touch-operated by an operator, a support that supports the operation panel to a printed circuit board in a manner that the operation panel is displaceable in one axial direction, which extends along the touch surface, and an actuator that vibrates the operation panel in the one axial direction. The support is configured by metal plate springs disposed respectively in four places between the printed circuit board and one of the operation panel and a metal fitting fixed to the operation panel. The plate springs each have a spring property only in the one axial direction.

13 Claims, 3 Drawing Sheets

INPUT DEVICE

TECHNICAL FIELD

The present invention relates to an input device.

BACKGROUND ART

Patent Literature 1 discloses an input device including: a plate-like operation panel in which a touch sensor is placed, and which has a touch surface that is to be touch-operated by an operator; supporting means for supporting the operation panel to a fixing portion in a manner that the operation panel is displaceable in one axial direction that extends along the touch surface; and an actuator that vibrates the operation panel in the one axial direction, the supporting means being configured by elastic blocks which are disposed respectively in a plurality of places between the operation panel and the fixing portion.

In the input device, when the touch surface of the operation panel is touch-operated by the operator, the operation panel is vibrated in the one axial direction which extends along the touch surface, thereby generating a tactile sensation on the fingertip of the operator which is contacted with the touch surface.

PRIOR ART LITERATURE

Patent Literature

Patent Literature 1 Japanese Unexamined Patent Application Publication No. 2007-034991

SUMMARY OF INVENTION

In the input device disclosed in Patent Literature 1, however, the supporting means for supporting the operation panel to the fixing portion is configured by the elastic blocks which are disposed respectively in a plurality of places between the operation panel and the fixing portion. Therefore, the operation panel can be displaced not only in the one axial direction which extends along the touch surface, i.e., the vibration direction, but also in other directions. Consequently, there is a problem in that, unless a structure for limiting displacement of the operation panel in a direction other than the vibration direction, and allowing the operation panel to be displaced in the vibration direction is disposed, the vibration direction of the operation panel is dispersed, and it is difficult to efficiently vibrate the operation panel.

It is an object of the invention to provide an input device in which, without disposing a structure for limiting displacement of an operation panel in a direction other than a vibration direction, and allowing the operation panel to be displaced in the vibration direction, dispersion of the vibration direction of the operation panel can be reduced, and the operation panel can be efficiently vibrated.

1. An input device which includes: a plate-like operation panel in which a touch sensor is placed, the plate-like operation panel having a touch surface to be touch-operated by an operator; supporting means for supporting the operation panel to a fixing portion in a manner that the operation panel is displaceable in one axial direction which extends along the touch surface; and an actuator that vibrates the operation panel in the one axial direction, the supporting means is configured by metal plate springs disposed respectively in a plurality of places between the fixing portion and one of the operation panel and a metal fitting fixed to the operation panel, and the plate springs each have a spring property only in the one axial direction.

2. The input device of 1 above in which each of the plate springs has: an intermediate portion placed in one plane that is perpendicular to the one axial direction and flexurally deformable only in the one axial direction; one end portion formed continuously with one end of the intermediate portion in a state where the one end portion is perpendicularly bent at the one end; and the other end portion formed continuously with the other end of the intermediate portion in a state where the other end portion is perpendicularly bent at the other end, the one end portion is fixed to the fixing portion, and the other end portion is fixed to one of the operation panel and the metal fitting.

3. The input device of 2 above in which each of the plate springs has a Z shape in a side view, and the one end portion and the other end portion are formed continuously with the intermediate portion in a state where the one end portion and the other end portion are bent with respect to the intermediate portion in opposite directions.

4. The input device of any one of 1 to 3 above in which the operation panel has a rectangular shape in a plan view, and is placed in a state where one set of opposite sides of the rectangular shape extends along the one axial direction, and at least four plate springs are disposed and couple one of four corner portions of the operation panel and four corner portions of the metal fitting to the fixing portion, respectively.

5. The input device of any one of 1 to 4 above in which a vibration amplitude of the operation panel is 0.1 mm to 0.5 mm.

According to the invention, the supporting means for supporting the operation panel to the fixing portion is configured by the metal plate springs which are disposed respectively in a plurality of places between the fixing portion and the operation panel or the metal fitting that is fixed to the operation panel, and the plate springs have a spring property only in the one axial direction which extends along the touch surface of the operation panel, i.e., the vibration direction, thereby forming a structure in which the plate springs themselves limit displacement of the operation panel in a direction other than the vibration direction, and the operation panel is allowed to be displaced in the vibration direction. Therefore, it is possible to provide an input device in which, without disposing a dedicated structure for limiting displacement of the operation panel in a direction other than the vibration direction, dispersion of the vibration direction of the operation panel can be reduced, and the operation panel can be efficiently vibrated.

BRIEF DESCRIPTION OF THE DRAWINGS

FIG. 1(A) is a plan view, and FIG. 1(B) is a side view.

FIG. 3(A) is a plan view, and FIG. 3(B) is a side view.

DETAILED DESCRIPTION OF PREFERRED EMBODIMENTS

Preferred embodiments of the input device of the invention will now be described with reference to the drawings.

Figure 1A:
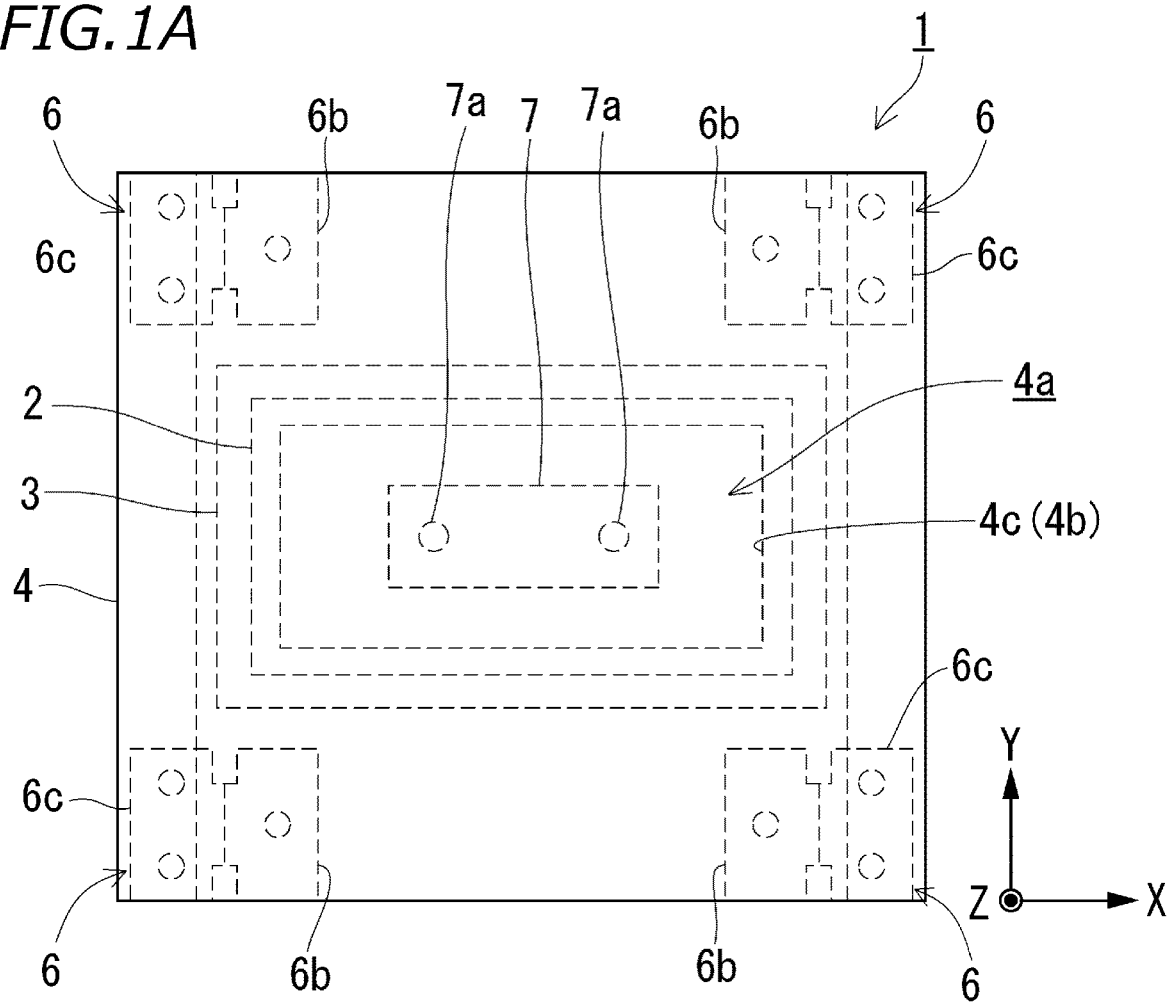
FIGS. 1(A) and 1(B) are views showing a touch panel of an embodiment of the invention.
Figure 1B:
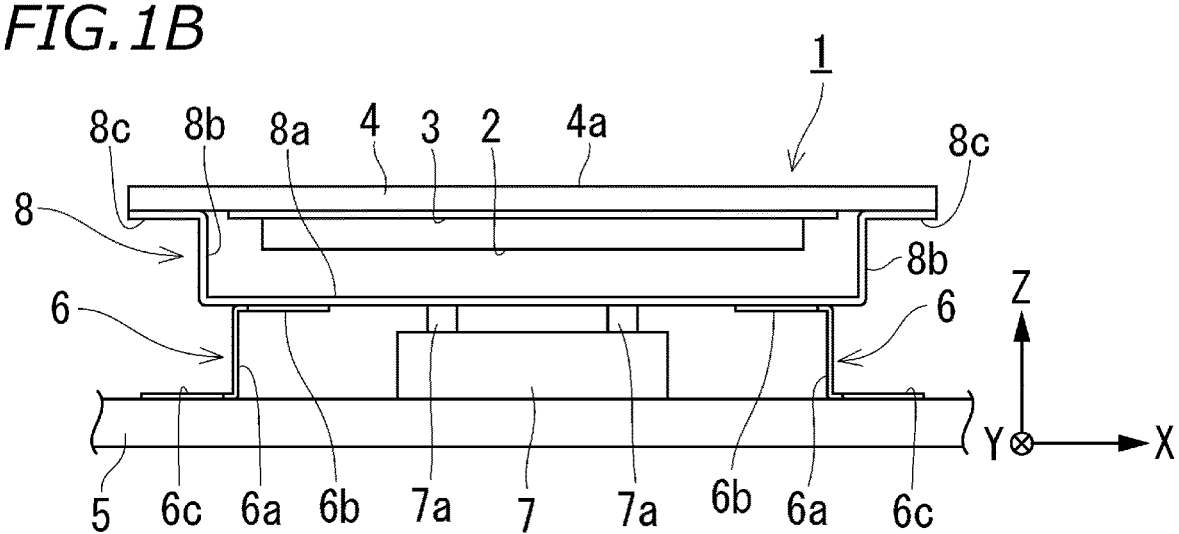
Figure 2:
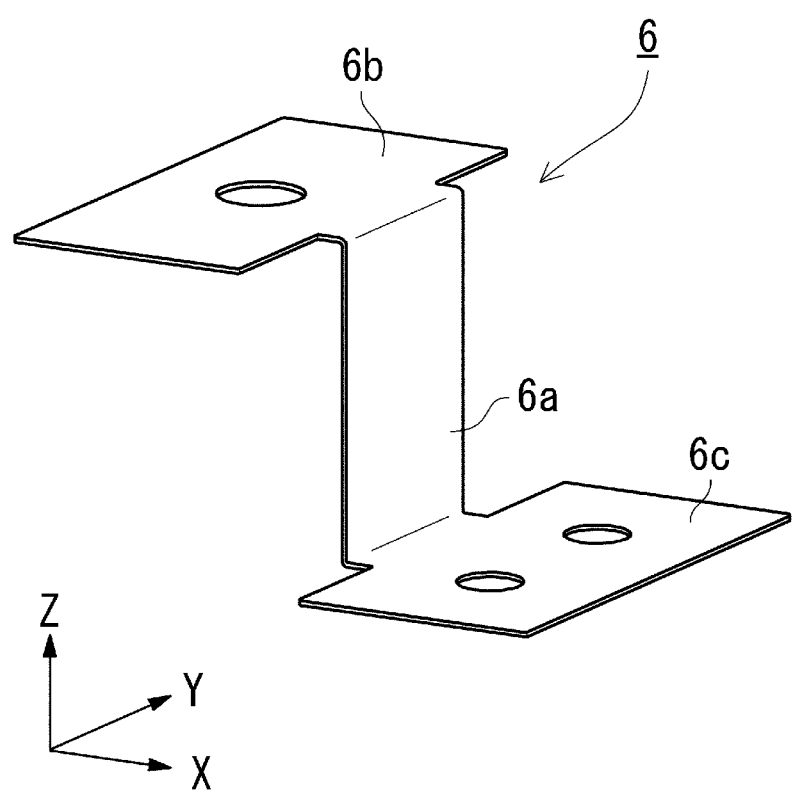
FIG. 2 is a perspective view of a plate spring.

FIGS. 1(A) and 1(B) are views showing a touch panel 1 of an embodiment of the invention, FIG. 1(A) is a plan view, and FIG. 1(B) is a side view. FIG. 2 is a perspective view of a plate spring 6. In the figures, a three-dimensional orthogonal coordinate system is shown. In the three-dimensional orthogonal coordinate system, the Z (-axis) direction coincides with the direction perpendicular to a touch surface 4*a* of an operation panel 4. The +Z direction is directed toward the surface side that receives a touch input. The X (-axis) and Y (-axis) directions coincide with the directions that extend along the end sides of the operation panel 4 having a plate-like rectangular shape, respectively. More specifically, the X direction coincides with the direction that extends along the long sides that is one set of the opposite sides of the operation panel 4, and the Y direction coincides with the direction that extends along the short sides or the other one set of the opposite sides of the operation panel 4. FIG. 1(A) is an XY plan view of the touch panel 1, and FIG. 2 is a perspective view of the plate spring 6 that is in the lower right portion of FIG. 1(A).

The touch panel 1 shown in FIGS. 1(A) and 1(B) is configured by: a display panel 2 in which functions of operating a vehicle navigation system, an audio device, and an air conditioner are aggregated in a rectangular display to be mounted on a center console of a vehicle, the longitudinal direction coinciding with the vehicle width direction, such as a 9.7 inch liquid crystal display (LCD), which is a 9.7 inch liquid crystal display; the plate-like operation panel 4 on which a touch sensor 3 is placed, which has the touch surface 4*a* to be touch-operated by an operator who is an occupant of the vehicle; supporting means for supporting the operation panel 4 to a fixing portion in a manner that the operation panel is displaceable in the X direction that is one axial direction which extends along the touch surface 4*a*; an actuator 7 that vibrates the operation panel 4 in the X direction; and a metal fitting 8 fixed to the operation panel 4.

The operation panel 4 is formed into a plate-like rectangular shape which is made of a transparent resin material such as an acrylic resin or a polycarbonate resin and has a thickness of, for example, 2 mm to 3 mm, and has a surface (front surface) and rear surface (back surface) that are opposite to each other. The front and rear surfaces are planes which are parallel to each other. The front surface is an XY plane on the +Z side, and the rear surface is an XY plane on the -Z side. The operation panel 4 further has one set of opposite sides (two end sides) which extend along the X direction, and another one set of opposite sides (two end sides) which extend along the Y direction. The one set of opposite sides which extend along the X direction are the long sides, and the other set of opposite sides which extend along the Y direction are the short sides.

For example, decorative black printing is applied to a peripheral edge portion of the operation panel 4. The printed portion is a frame-like decorative layer 4*b*. The decorative layer 4*b* defines a rectangular transparent window portion 4*c* in the middle area of the operation panel 4. The middle area that is of the front surface of the operation panel 4, which corresponds to the transparent window portion 4*c* is formed as the touch surface 4*a*.

The touch sensor 3 is an electrostatic capacitive touch sensor which is transparent and has a rectangular sheet-like shape. The touch sensor is bonded to the middle area of the rear surface of the operation panel 4 that corresponds to the transparent window portion 4*c*, through a transparent adhesive agent to be opposed to the touch surface 4*a*. The touch sensor can detect the coordinate position (the X and Y coordinates) of the finger of the operator that is contacted with the touch surface 4*a*.

The display panel 2 is bonded to the rear surface of the touch sensor 3 through a transparent adhesive agent so that an image which is displayed on the screen of the display panel 2 can be seen by the operator through the touch sensor 3 that is placed on the front surface side, and the transparent window portion 4*c* and touch surface 4*a* of the operation panel 4.

In FIG. 1(B), the reference numeral 5 represents a printed circuit board. The printed circuit board 5 is opposed and parallel to the rear surface side (back surface side) of the operation panel 4 that functions as a cover panel (designed panel) fixed to the interior of a center console of the vehicle and covers an opening of the center console with forming a gap allowing the printed circuit board to be vibrated, between the opening and the printed circuit board.

In the printed circuit board 5, an actuator 7 is disposed together with: a microcomputer which is a controller for the touch panel 1; a vehicle LAN interface with respect to in-vehicle devices to be operated, such as a vehicle navigation system, an audio device, and an air conditioner; and a driving circuit for the actuator 7.

Then, the operation panel 4 is supported on the printed circuit board 5 that functions as the fixing portion, through the supporting means in a manner that the operation panel can be displaced in the X direction that is the one direction extending along the touch surface 4*a*.

The metal fitting 8 is formed by punching and bending a metal plate into a predetermined shape. The plan shape of the metal fitting 8 is the same rectangular shape as the operation panel 4. A section of the metal fitting 8 which is taken along a plane that is perpendicular to the Y direction is formed into a hat-like shape. The metal fitting 8 has: a rectangular bottom plate portion 8*a* which is formed in the middle portion in the width direction that extends along the X direction; a pair of side plate portions 8*b* which are perpendicularly raised from both end edges in the width direction of the bottom plate portion 8*a*, respectively; and a pair of flange portions 8*c* which are perpendicularly projected from the upper end edges of the side plate portions 8*b* to the width outer side.

A plurality of places in the pair of flange portions 8*c* are fixed by thermal crimping to both end portions in the width direction extending along the X direction of the rear surface of the operation panel 4, whereby the metal fitting 8 is fixed to the rear surface of the operation panel 4 in a state where the bottom plate portion 8*a* is separated in parallel from the rear surface of the operation panel 4. The touch sensor 3 and the display panel 2 are accommodated and placed in a gap (space) between the rear surface of the operation panel 4 and the bottom plate portion 8*a* of the metal fitting 8.

The supporting means is configured by metal plate springs 6 which are disposed respectively in a plurality of places between the printed circuit board 5 that functions as the fixing portion and the operation panel 4. The plate springs 6 have a spring property only in the X direction that is the one axial direction extending along the touch surface 4*a* of the operation panel 4.

Since the metal fitting 8 is fixed to the rear surface of the operation panel 4, the plate springs 6 that function as the supporting means are disposed respectively in a plurality of places between the printed circuit board 5 that functions as the fixing portion and the metal fitting 8. More specifically, the plate springs 6 are disposed respectively on the rear surfaces of four corner portions of the metal fitting 8 that correspond to those of the operation panel 4 and between the metal fitting 8 and the printed circuit board 5, and the four corner portions of the metal fitting 8 are coupled to the printed circuit board 5, thereby supporting the operation panel 4 on the printed circuit board 5 in a manner that the operation panel can be displaced in the X direction. Namely, the supporting means is configured by the four plate springs 6 disposed on the rear surfaces of four corner portions of the metal fitting 8 that correspond to those of the operation panel 4 and between the metal fitting 8 and the printed circuit board 5, which have a spring property only in the X direction, and the same structure as each other.

The plate springs 6 are formed by punching and bending, for example, a spring phosphor bronze plate or a stainless steel strip into a predetermined shape. Each of the plate springs 6 having a spring property only in the X direction has: a plate-like rectangular intermediate portion 6a placed in one plane that is perpendicular to the X direction and is flexurally deformable only in the X direction; a plate-like rectangular one end portion 6b formed continuously with one end of the intermediate portion 6a in a state where the one end portion is perpendicularly bent at the one end; and a plate-like rectangular other end portion 6c formed continuously with the other end of the intermediate portion 6a in a state where the other end portion is perpendicularly bent at the other end. Each of the plate springs 6 has a Z shape in a side view as seen in the Y direction, and the one end portion 6b and the other end portion 6c are formed continuously with the intermediate portion in a state where the one end portion and the other end portion are bent in opposite directions with respect to the intermediate portion 6a.

The one end portions 6b of the four plate springs 6 are joined and fixed by rivets to the four corner portions of the bottom plate portion 8a of the metal fitting 8, respectively, and the other end portion 6c of the four plate springs 6 are joined and fixed by rivets to the printed circuit board 5.

Among the four plate springs 6, the two plate springs 6 provided respectively in the upper left and right portions of FIG. 1(A) are disposed bilaterally symmetrically about one linear line which extends along the Y direction to pass through the center of the operation panel 4. Similarly, the two plate springs 6 provided respectively in the lower left and right portions of FIG. 1(A) are disposed bilaterally symmetrically about one linear line which extends along the Y direction to pass through the center of the operation panel 4.

The two plate springs 6 provided respectively in the left upper and lower portions of FIG. 1(A) are disposed vertically symmetrically about one linear line which extends along the X direction to pass through the center of the operation panel 4. Similarly, the two plate springs 6 provided respectively in the right lower and left portions of FIG. 1(A) are disposed vertically symmetrically about one linear line which extends along the X direction to pass through the center of the operation panel 4.

Each of the two plate springs 6 provided respectively in the left upper and lower portions of FIG. 1(A) is disposed in a direction in which the one end portion 6b is projected to the right side (inner side), and the other end portion 6c is projected to the left side (outer side). On the contrary, each of the two plate springs 6 provided respectively in the right upper and lower portions of FIG. 1(A) is disposed in a direction in which the one end portion 6b is projected to the left side (inner side), and the other end portion 6c is projected to the right side (outer side). With respect to the directions of the four plate springs 6, alternatively, the two plate springs 6 provided respectively in the left upper and lower portions of FIG. 1(A), and the two plate springs 6 provided respectively in the right upper and lower portions of FIG. 1(A) may be disposed while being oriented in the same direction.

The actuator 7 is configured by a solenoid. The solenoid includes a stationary electrode, a movable electrode, a base member, and an elastic member. The stationary electrode is configured by a lamination of planer cores formed into an L-like shape having long and short legs. A coil is wound around the long leg of the stationary electrode. When the coil is energized, the movable electrode is magnetically attracted to the stationary electrode and is moved in the −X direction (the left side of the sheet of FIG. 1(B)). The movable electrode is configured by a lamination of planer cores formed into an L-like shape having long and short legs that is identical with the shape of the stationary electrode and is movably placed on the base member. The stationary electrode and the movable electrode are placed so that the long leg of one of the electrode is opposed to the short leg of the other electrode through a gap in the X direction, and the electrodes are placed so as to form a rectangular shape as a whole. The base member is configured by a resin-made flat plate. The stationary electrode and the movable electrode are placed on the upper surface of the base member. When the coil is not energized, the elastic member urges the movable electrode in the direction along which the electrode is separated from the stationary electrode. When the coil is energized, the movable electrode is magnetically attracted to the stationary electrode and is moved in the −X direction. When the coil is not energized, the movable electrode is moved in the +X direction (the right side of the sheet of FIG. 1(B)) because of the spring property of the elastic member the force of which is smaller than the magnetic attractive force generated when the coil is energized and returns to the position in the initial state.

The actuator 7 further includes two coupling pins 7a through which the vibration of the movable electrode in the X direction is transmitted to the operation panel 4, thereby vibrating the operation panel 4 in the X direction, which are moved integrally with the movable electrode. The coupling pins 7a are fixed to and upward projected from the both end portions of the upper portion of the long leg of the movable electrode, respectively.

Since the metal fitting 8 is fixed to the rear surface of the operation panel 4, the actuator 7 can be placed on the rear surface side of the middle portion of the operation panel 4. Therefore, a uniform tactile sensation can be produced by the single actuator 7. The actuator 7 is disposed in one place of the upper surface of the printed circuit board 5 that corresponds to the middle portion of the operation panel 4, the base member of the actuator is fixed to the printed circuit board 5 by screwing, and the coupling pins 7a of the actuator are engaged and coupled to holes formed in the bottom plate portion 8a of the metal fitting 8, respectively.

In order to improve the touch feeling or increase the size of the operation panel 4, a plurality of actuators 7 may be disposed.

The actuator 7 is driven and controlled so that the vibration amplitude of the operation panel 4 is 0.1 mm to 0.5 mm.

In the thus configured touch panel 1, when the touch surface 4a of the operation panel 4 is touch-operated by the operator, the actuator 7 vibrates in the X direction. This causes the operation panel 4 to be vibrated in the X direction. When the operation panel 4 is vibrated in the X direction in this way, tactile feedback can be provided to the fingertip of the operator which is contacted with the touch surface 4a.

According to the touch panel 1 of the embodiment, as described above, the supporting means for supporting the operation panel 4 to the printed circuit board 5 that functions as the fixing portion is configured by the plate springs 6 disposed respectively in a plurality of places (four places) between the printed circuit board 5 and the metal fitting 8 fixed to the operation panel 4. The plate springs 6 have the spring property only in the X direction that is the one axial direction that extends along the touch surface 4a of the operation panel 4, i.e., the vibration direction, thereby forming the structure in which the plate springs 6 themselves limit displacement in a direction (the Y and Z directions) other than the vibration direction (the X direction) of the operation panel 4, and the operation panel 4 is allowed to be displaced in the vibration direction. Without disposing a dedicated structure for limiting displacement in a direction other than the vibration direction, therefore, dispersion of the vibration direction of the operation panel 4 can be reduced, and the operation panel 4 can be efficiently vibrated.

The vibration amplitude of the operation panel 4 is 0.1 mm to 0.5 mm. When the amplitude is excessively small, the restoring force created by the spring property (elasticity) of the plate springs 6, which is oriented in the −X direction cannot be obtained. When the amplitude is excessively large, the movement of the operation panel 4 is visually observable. Therefore, the resulting product is low in quality. In the case where the amplitude is 0.1 mm to 0.5 mm, even when vibration has a low frequency of 50 Hz or less, for example, it is possible to obtain clear tactile feedback.

Figure 3A:
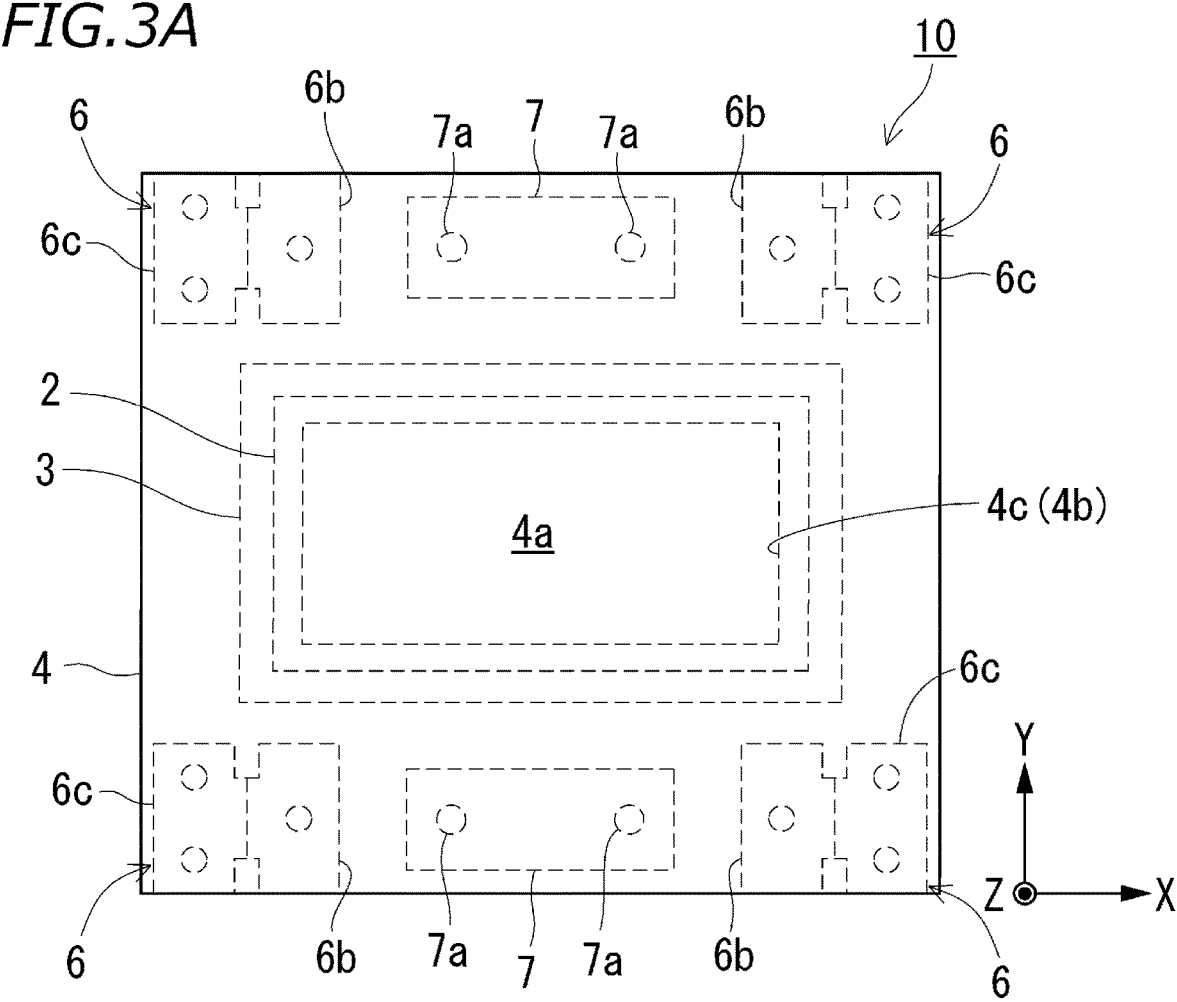
FIGS. 3(A) and 3(B) are views showing a touch panel of another embodiment of the invention.
Figure 3B:
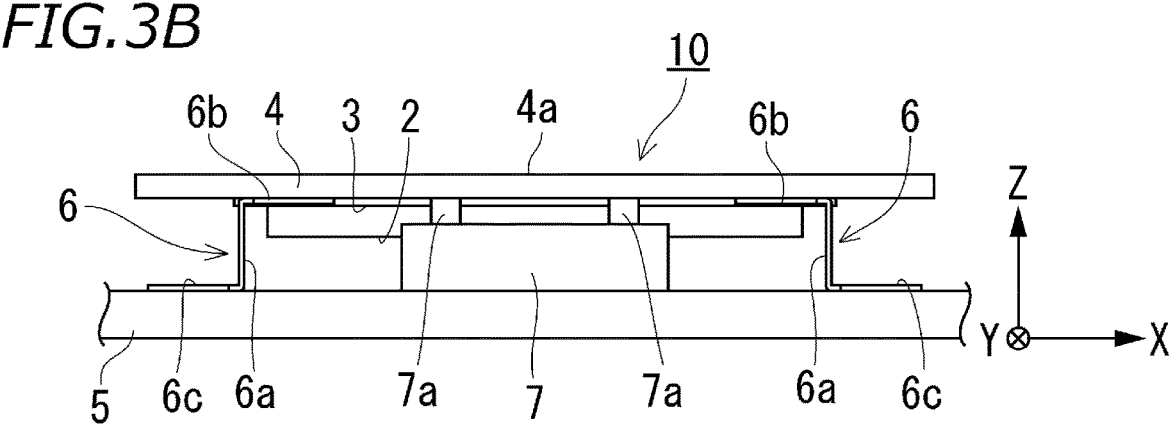

FIGS. 3(A) and 3(B) are views showing a touch panel 10 of another embodiment of the invention. FIG. 3(A) is a plan view, and FIG. 3(B) is a side view.

The touch panel 10 shown in FIGS. 3(A) and 3(B) is different from the touch panel 1 shown in FIGS. 1(A) and 1(B) in that the touch panel 10 does not include the metal fitting 8 fixed to the operation panel 4, and also in the following two points associated therewith, has the same structure as the touch panel 1 shown in FIGS. 1(A) and 1(B) other than the above, and exerts the same effects as the touch panel 1.

In the touch panel 10, the metal fitting 8 is not fixed to the rear surface of the operation panel 4, and therefore the one end portions 6b of the plate springs 6 are joined and fixed by rivets to the four corner portions of the rear surface of the operation panel 4, respectively. Actuators 7 are disposed on the upper surface of the printed circuit board 5 that corresponds to the peripheral edge portion of the operation panel 4. The base members of the actuators are fixed to the printed circuit board 5 by screwing, and the coupling pins 7a of the actuators are engaged and coupled to holes formed in the operation panel 4, respectively. The actuators 7 are disposed on the upper surface of the printed circuit board 5 that corresponds to the peripheral edge portion of the operation panel 4, or specifically the actuators are disposed respectively in one place between the two plate springs 6, which are respectively in the upper left and right portions of FIG. 3(A), and one place between the two plate springs 6 which are respectively in the lower left and right portions of FIG. 3(A), or in two places in total. Alternatively, only one actuator 7 may be used, and disposed in only one of these places.

While the embodiments of the invention have been described so far, the invention is not limited to the embodiments, and may be variously changed and modified without departing from the spirit of the invention. In a center console or instrument panel of a vehicle, in addition to a touch panel having both a displaying function and an inputting function, for example, also a touch switch and touch pad which do not have a displaying function, and which have only an inputting function are disposed. The invention can be applied to also input devices such as above-described ones or a touch switch and a touch pad. Alternatively, housings or frames of various in-vehicle devices may be used as the fixing portion, and the operation panel may be fixed through a plurality of plate springs to the fixing portion in a manner that the operation panel can be displaced in one direction extending along the touch surface. The touch sensor may be placed on the front surface of the operation panel. The input device may include a touch sensor of a type other than the electrostatic capacitive type, such as a resistance film touch sensor.

DESCRIPTION OF REFERENCE NUMERALS

1: touch panel (electrostatic capacitive touch panel) (input device); 3: touch sensor (electrostatic capacitive touch sensor); 4: operation panel (resin molded panel); 4a: touch surface; 5: printed circuit board (fixing portion); 6: plate spring (supporting means); 7: actuator (solenoid); and 8: metal fitting

What is claimed is:

1. An input device comprising:
   a touch sensor;
   a plate-like operation panel in which the touch sensor is placed, the plate-like operation panel having a touch surface to be touch-operated by an operator;
   a support for allowing the operation panel to be supported on a fixing portion in a manner that the operation panel is displaceable in one axial direction which extends along the touch surface; and
   an actuator that vibrates the operation panel in the one axial direction,
   the support is configured by metal plate springs disposed respectively in a plurality of places between the fixing portion and one of the operation panel and a metal fitting fixed to the operation panel, and the plate springs each have a spring property only in the one axial direction,
   wherein the actuator is disposed on the fixing portion and is coupled to the operation panel or the metal fitting to vibrate the operation panel only in the one axial direction.

2. The input device according to claim 1, wherein each of the plate springs has: an intermediate portion placed in one plane that is perpendicular to the one axial direction and flexurally deformable only in the one axial direction; one end portion formed continuously with one end of the intermediate portion in a state where the one end portion is perpendicularly bent at the one end; and the other end portion formed continuously with the other end of the intermediate portion in a state where the other end portion is perpendicularly bent at the other end, the one end portion is fixed to the fixing portion, and the other end portion is fixed to one of the operation panel and the metal fitting.

3. The input device according to claim 2, wherein each of the plate springs has a Z shape in a side view, and the one end portion and the other end portion are formed continuously with the intermediate portion in a state where the one end portion and the other end portion are bent, with respect to the intermediate portion, in opposite directions.

4. The input device according to claim 1, wherein the operation panel has a rectangular shape in a plan view and is placed in a state where one set of opposite sides of the rectangular shape extends along the one axial direction, and at least four plate springs are disposed and couple one of four corner portions of the operation panel and four corner portions of the metal fitting to the fixing portion, respectively.

5. The input device according to claim 1, wherein a vibration amplitude of the operation panel is between 0.1 mm to 0.5 mm.

6. The input device according to claim 1, wherein the operation panel has a rectangular shape in a plan view and is placed in a state where one set of opposite sides of the rectangular shape extends along the one axial direction, at least four plate springs are disposed and couple one of four corner portions of the operation panel and four corner portions of the metal fitting to the fixing portion, respectively, and a vibration amplitude of the operation panel is between 0.1 mm to 0.5 mm.

7. The input device according to claim 2, wherein the operation panel has a rectangular shape in a plan view and is placed in a state where one set of opposite sides of the rectangular shape extends along the one axial direction, and at least four plate springs are disposed and couple one of four corner portions of the operation panel and four corner portions of the metal fitting to the fixing portion, respectively.

8. The input device according to claim 2, wherein a vibration amplitude of the operation panel is between 0.1 mm to 0.5 mm.

9. The input device according to claim 2, wherein the operation panel has a rectangular shape in a plan view and is placed in a state where one set of opposite sides of the rectangular shape extends along the one axial direction, at least four plate springs are disposed and couple one of four corner portions of the operation panel and four corner portions of the metal fitting to the fixing portion, respectively, and a vibration amplitude of the operation panel is between 0.1 mm to 0.5 mm.

10. The input device according to claim 3, wherein the operation panel has a rectangular shape in a plan view and is placed in a state where one set of opposite sides of the rectangular shape extends along the one axial direction, and at least four plate springs are disposed and couple one of four corner portions of the operation panel and four corner portions of the metal fitting to the fixing portion, respectively.

11. The input device according to claim 3, wherein a vibration amplitude of the operation panel is between 0.1 mm to 0.5 mm.

12. The input device according to claim 3, wherein the operation panel has a rectangular shape in a plan view and is placed in a state where one set of opposite sides of the rectangular shape extends along the one axial direction, at least four plate springs are disposed and couple one of four corner portions of the operation panel and four corner portions of the metal fitting to the fixing portion, respectively, and a vibration amplitude of the operation panel is between 0.1 mm to 0.5 mm.

13. The input device according to claim 1, wherein the actuator is directly disposed on the fixing portion.

* * * * *